United States Patent
Barnikel et al.

(10) Patent No.: US 9,370,795 B2
(45) Date of Patent: *Jun. 21, 2016

(54) METHOD FOR APPLYING A WEAR-RESISTANT LAYER TO A TURBOMACHINE COMPONENT

(71) Applicant: Siemens Aktiengesellschaft, Munich (DE)

(72) Inventors: Jochen Barnikel, Mulheim an der Ruhr (DE); Susanne Gollerthan, Bochum (DE); Harald Krappitz, Kirchheim unter Teck (DE); Ingo Reinkensmeier, Frondenberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/351,191

(22) PCT Filed: Sep. 21, 2012

(86) PCT No.: PCT/EP2012/068650
§ 371 (c)(1),
(2) Date: Apr. 11, 2014

(87) PCT Pub. No.: WO2013/053581
PCT Pub. Date: Apr. 18, 2013

(65) Prior Publication Data
US 2014/0272464 A1    Sep. 18, 2014

(30) Foreign Application Priority Data
Oct. 14, 2011    (EP) .................................. 11185210

(51) Int. Cl.
*B23K 1/00*    (2006.01)
*B23K 1/19*    (2006.01)
(Continued)

(52) U.S. Cl.
CPC ................ *B05D 3/0254* (2013.01); *B05D 5/00* (2013.01); *B23K 31/02* (2013.01); *B23K 35/025* (2013.01);
(Continued)

(58) Field of Classification Search
CPC .. B23K 1/0018; B23K 35/327; B23K 35/325; B23K 1/19; B23K 35/0244; B23K 35/28; B23K 1/002; B23K 1/012; B23K 2201/001; B23K 31/02; B23K 35/005; B23K 35/0222; B23K 35/0233; B23K 35/025; B23K 35/32; B23K 35/38; B22F 2007/068; B22F 7/064; B22F 7/08; B22F 7/062; C22C 32/0052; C22C 32/0084; C23C 26/02; C23C 30/00; C23C 24/10; C23C 24/103; C23C 26/00; C23C 28/022; C23C 28/027; C23C 28/028; C23C 2/04; C23C 8/64; C23C 8/80
See application file for complete search history.

(56) References Cited

U.S. PATENT DOCUMENTS 3,417,460 A * 12/1968 Galmiche ...................... 228/121
4,851,188 A *  7/1989 Schaefer et al. .................. 419/9
(Continued)

FOREIGN PATENT DOCUMENTS

CA    2070522 A1    1/1993
CN    101602132 A    12/2009
(Continued)

Primary Examiner — Erin Saad
(74) Attorney, Agent, or Firm — Beusse Wolter Sanks & Maire

(57) ABSTRACT

A method for applying a wear protection layer to a continuous flow machine component which has a base material comprising titanium is provided. The method includes the following steps: mixing a solder which comprises an alloy comprising titanium and particles which are distributed in the alloy and have a reaction agent; applying the solder to predetermined points of the continuous flow machine component; introducing a heat volume into the solder and the continuous flow machine component so that the alloy becomes liquid and the reaction agent changes through diffusion processes with the solder and undergoes a chemical reaction with the alloy, forming a hard aggregate; and cooling the solder so that the alloy becomes solid.

17 Claims, 2 Drawing Sheets

(51) Int. Cl.
  *B05D 3/02* (2006.01)
  *B23K 35/32* (2006.01)
  *C23C 8/64* (2006.01)
  *C23C 8/80* (2006.01)
  *F01D 5/28* (2006.01)
  *B23K 35/02* (2006.01)
  *B05D 5/00* (2006.01)
  *B23K 31/02* (2006.01)

(52) U.S. Cl.
  CPC ............... *B23K 35/32* (2013.01); *B23K 35/325* (2013.01); *B23K 35/327* (2013.01); *C23C 8/64* (2013.01); *C23C 8/80* (2013.01); *F01D 5/286* (2013.01); *F05D 2230/236* (2013.01); *F05D 2230/237* (2013.01); *Y10T 156/10* (2015.01); *Y10T 428/12806* (2015.01)

(56) References Cited

U.S. PATENT DOCUMENTS

| | | | |
|---|---|---|---|
| 5,068,003 A | 11/1991 | Takahashi | |
| 5,141,574 A | 8/1992 | Nakanishi | |
| 5,240,762 A | 8/1993 | Azuma | |
| 5,785,109 A * | 7/1998 | Hongawa | 164/59.1 |
| 6,223,976 B1 | 5/2001 | Clement et al. | |
| 2007/0090152 A1* | 4/2007 | Meier et al. | 228/101 |
| 2010/0322780 A1* | 12/2010 | Manier | 416/241 R |

FOREIGN PATENT DOCUMENTS

| | | |
|---|---|---|
| DE | 3937526 A1 | 5/1990 |
| DE | 69815011 T2 | 4/2004 |
| FR | 2663343 A1 | 12/1991 |
| FR | 266343 B1 | 9/1992 |
| FR | 2663343 B1 | 9/1992 |
| JP | S63093875 A | 4/1988 |
| JP | H02129330 A | 5/1990 |
| JP | H02163403 A | 6/1990 |
| JP | 3150331 A | 6/1991 |
| JP | 03150331 A | 5/1992 |
| JP | H05202891 A | 8/1993 |
| JP | H11170036 A | 6/1999 |

* cited by examiner

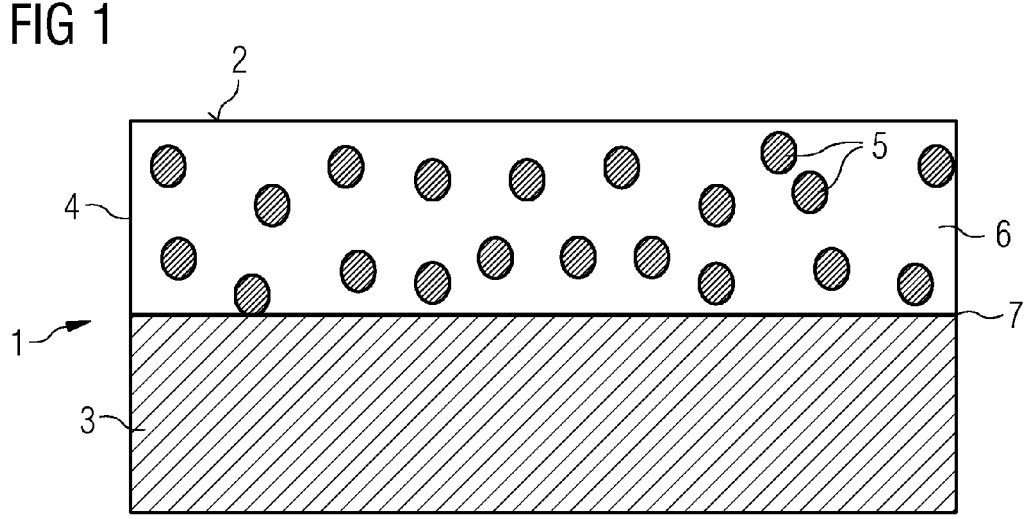
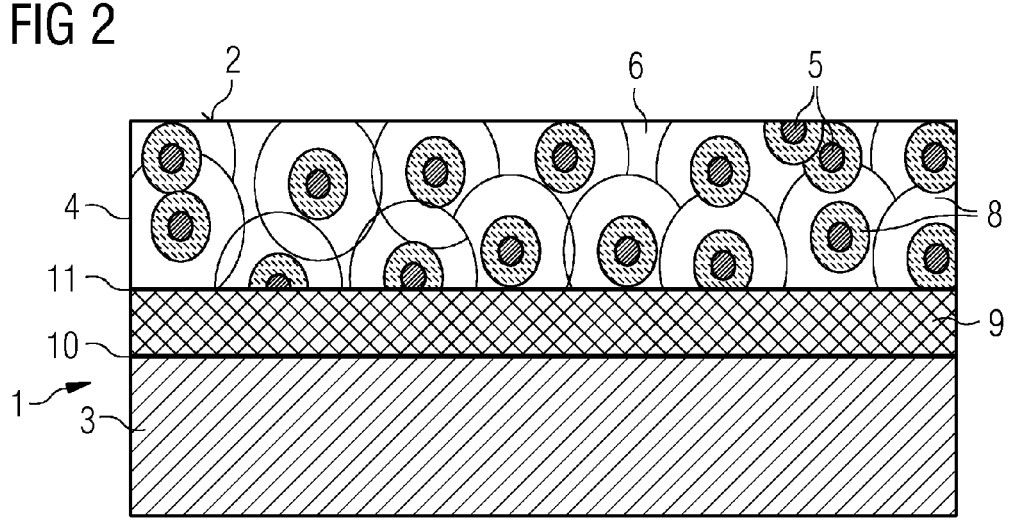

METHOD FOR APPLYING A WEAR-RESISTANT LAYER TO A TURBOMACHINE COMPONENT

CROSS REFERENCE TO RELATED APPLICATIONS

This application is the US National Stage of International Application No. PCT/EP2012/068650 filed Sep. 21, 2012, and claims the benefit thereof. The International Application claims the benefit of European Application No. EP11185210 filed Oct. 14, 2011. All of the applications are incorporated by reference herein in their entirety.

FIELD OF INVENTION

The invention relates to a method for applying a wear-resistant layer to a turbomachine component.

BACKGROUND OF INVENTION

A gas turbine has a compressor and a turbine. Blades or vanes are used both in the compressor and in the turbine, with a distinction being made between stationary guide vanes and rotating rotor blades.

Titanium alloys, which have a high strength, a low density and also good corrosion resistance, are used inter alia as the material for the rotor blades. The titanium alloys disadvantageously have a high notch sensitivity and high cracking sensitivity.

The rotor blades in particular are exposed to various wear processes, e.g. wear by friction or by oxidation. Specifically in a steam turbine, drop impingement erosion occurs as a wear process. Droplets of mist form from water in the steam turbine and are captured by the guide vanes, where they accumulate and break off from the outlet edges of the guide vanes as water drops. The water drops have a low absolute velocity, but, on account of the rotation of the rotor blades, they have a high velocity relative to the rotor blades. If the water drops impinge on the rotor blades with their high relative velocity, this leads to the formation of notches on the surface of the rotor blades.

Various methods are available for reducing the drop impingement erosion. A layer which is resistant to drop impingement erosion can be applied to the surface of the rotor blade by thermal spraying. Furthermore, a hard layer can be applied to the surface of the rotor blade by welding. However, the cracking sensitivity of the rotor blades is disadvantageously increased by said methods, particularly at the interfaces between the titanium alloy and the hard layer, as a result of which the service life of the rotor blades is reduced. Furthermore, it is disadvantageous that the layers cannot be reapplied to the rotor blade after damage caused by drop impingement erosion, because said methods require a smooth surface.

SUMMARY OF INVENTION

It is an object of the invention to provide a method for applying a wear-resistant layer to a turbomachine component and the turbomachine component having the wear-resistant layer, in which case the method can be employed easily and repeatedly and also the turbomachine component has a long service life.

The method according to the invention for applying a wear-resistant layer having a titanium-comprising base material to a turbomachine component comprises the following steps: mixing a solder which comprises a titanium-comprising alloy and particles that are distributed in the alloy and comprise a reactant; applying the solder to predetermined points of the turbomachine component; introducing a quantity of heat into the solder and into the turbomachine component, such that the alloy becomes liquid and the reactant changes through diffusion processes with the solder and undergoes a chemical reaction with the alloy, forming a hard material; cooling the solder, such that the alloy becomes solid.

The reactant is a nonmetal, a semi-metal and/or a ceramic. The reactant is a carbon-containing compound, in particular graphite, and the hard material titanium carbide is formed. In the method, graphite forms, in a chemical reaction with the titanium of the alloy, titanium carbide, which is advantageously hard and therefore has good resistance to wear, in particular to drop impingement erosion.

The base material is a titanium alloy, in particular TiAl6V4, pure titanium and/or pure titanium with additives, in particular carbon as an additive. TiAl6V4 has a beta transus temperature of approximately 960° C. to 985° C.

Since the hard material is formed in the method according to the invention, the wear-resistant layer advantageously has a hard form. Hard materials have a higher resistance to wear, in particular to drop impingement erosion, and therefore the wear-resistant layer produced in the method advantageously has a long service life. The method is advantageously simple and can be applied to any desired geometries of turbomachine components. Since both the base material and the solder comprise titanium, the base material and the solder have similar physical properties, as a result of which there is advantageously a good bond between the solder and the base material. The good bond advantageously reduces the formation of cracks at the interface between the base material and the solder. A turbomachine component subjected to a high level of loading is, for example, a rotor blade of a steam turbine. The cracks can arise in particular in the rotor blade, because the rotor blade is exposed to a high centrifugal force and also vibrations during operation of the steam turbine. Since the reactant changes through diffusion processes with solder, zones made up of the hard material which can be larger than the original particles are formed.

Since the method does not require any smooth surfaces of the turbomachine component, it is advantageously also suitable for use as a repair method for surfaces which have already undergone erosion. Since the solder is liquefied, it can advantageously penetrate into cracks, notches, troughs and craters, and fill these. A prerequisite for the repair of cracks is that the cracks are free of oxides. Any desired geometries of surface erosions are furthermore conceivable. Reworking advantageously makes it possible to restore the original surface contour of the turbomachine component. Furthermore, if the wear-resistant layer has become eroded, the method can be carried out repeatedly, and the original surface contour can be restored.

The solder is preferably produced in such a manner that it is a mat, a paste, a pre-sintered material (pre-sintered preforms, PSP) or a strip, in particular an adhesive strip. The mat is suitable if a wear-resistant layer having a large surface area is applied to the turbomachine component. The mat is preferably flexible, and therefore the mat can be applied to any desired surface contours of the turbomachine component. By contrast, the paste, the pre-sintered material and the strip are suitable if the wear-resistant layer is applied locally as a repair layer to points of the turbomachine component which have undergone particularly severe erosion.

The particles are preferably platelet-like and/or spherical. The platelet-like particles are preferably arranged in substantially plane-parallel layers. If the particles have a layer-like and plane-parallel arrangement, this gives rise, after the chemical reaction, to zones made up of the hard material which have a layer-like and plane-parallel arrangement and which advantageously have a high resistance to wear, in particular to drop impingement erosion. The composition of the alloy is preferably selected in such a manner that the melting temperature of the alloy is lower than the beta transus temperature of the base material. The beta transus temperature of pure titanium is approximately 880° C. Below this temperature, the lattice structure of the titanium is a very close-packed hexagonal structure, and above this temperature a body-centered cubic lattice structure forms. A change in the lattice structure shortens the service life of the turbomachine component. Since the melting temperature of the alloy lies below the beta transus temperature, a change in the lattice structure of the base material is avoided, as a result of which the service life of the turbomachine component is advantageously long.

The alloy is preferably a brazing solder, in particular with a melting temperature of between 750° C. and 950° C. The brazing solder is advantageously resistant to drop impingement erosion.

The quantity of heat and the time of introduction thereof are preferably determined in such a manner that the temperatures of the solder and of the turbomachine component are lower than the beta transus temperature of the base material. As a result, a change in the lattice structure of the titanium or of the titanium alloy can advantageously be avoided. Furthermore, the quantity of heat and the time of introduction thereof are advantageously determined in such a manner that the reactant is preferably completely absorbed in the titanium matrix, and therefore the hard material particle can be formed. The quantity of heat required to convert the reactant and the time of introduction depend on the size of the particles and also on the mass of the turbomachine component.

The quantity of heat and the time of introduction thereof are preferably determined in such a manner that the reactant partially passes through diffusion into the base material, where it undergoes a chemical reaction with the base material, forming the hard material. In addition to the reactant, the alloy also partially passes into the base material in the process. Similarly, material from the base material passes through diffusion into the wear-resistant layer. Through the diffusion, and since the hard material is also formed in the base material, there are no longer any erratic differences in the properties, for example the modulus of elasticity or the hardness, between the base material, the hard material and the alloy. The erratic differences are vulnerable to the formation of cracks, and therefore the service life of the wear-resistant layer is advantageously long.

The turbomachine component according to the invention has a wear-resistant layer which is produced by the method according to the invention.

BRIEF DESCRIPTION OF THE DRAWINGS

Hereinbelow, the method according to the invention for applying a wear-resistant layer to a turbomachine component will be explained on the basis of the attached schematic drawings, in which:

FIGS. 1 and 3 show a section of a surface region of a turbomachine component with a solder before heat is supplied, and FIGS. 2 and 4 show a section of the surface region of the turbomachine component shown in FIGS. 1 and 3 with a wear-resistant layer formed after heat has been supplied.

DETAILED DESCRIPTION OF INVENTION

Figure 3:
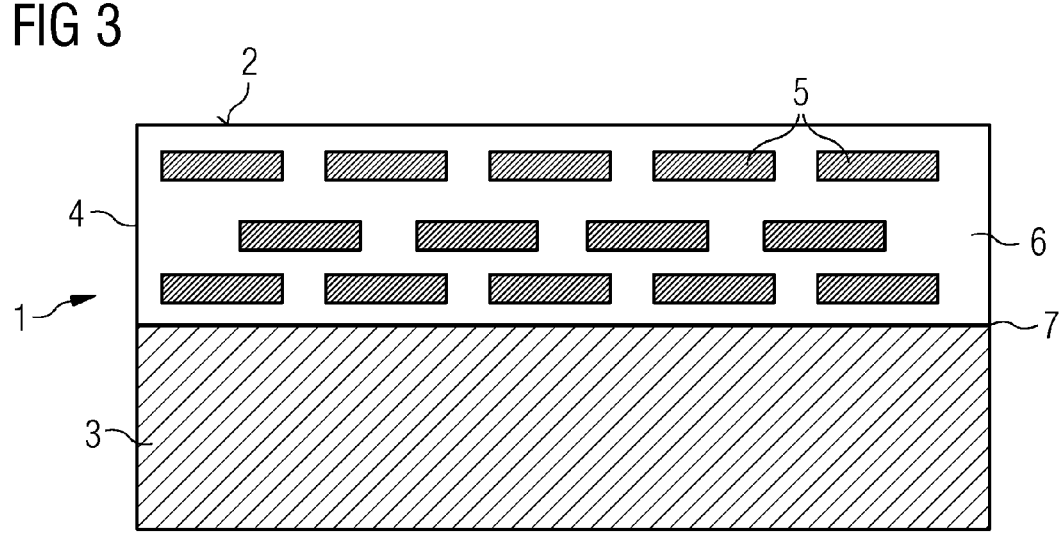
Figure 4:
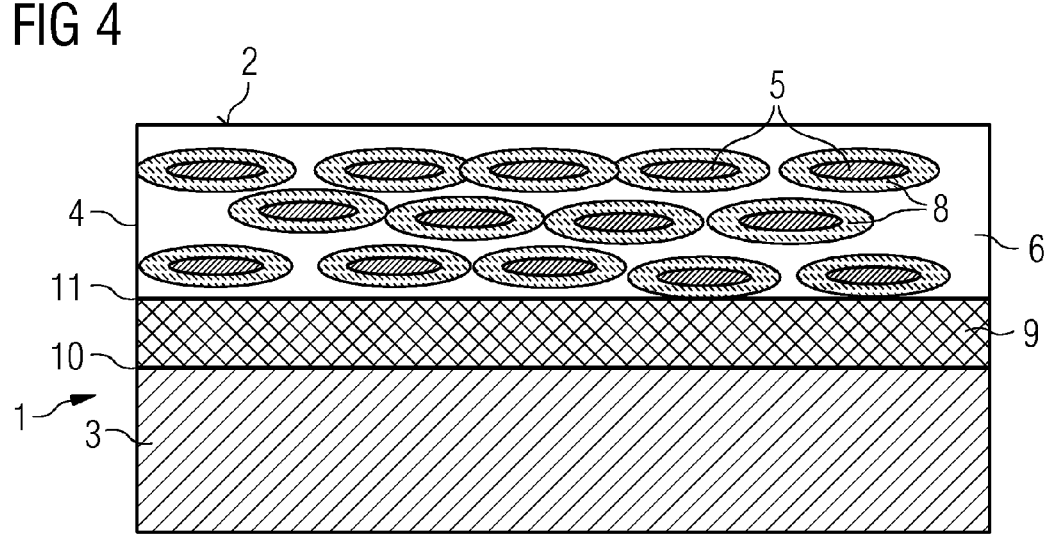

A turbomachine component, e.g. a rotor blade of a steam turbine, has a surface region 1. As can be seen from FIGS. 1 to 4, the surface region 1 has a surface 2 lying at the top. The surface 2 is exposed to wear. The surface region has a base material 3 lying at the bottom and a solder 12 lying at the top, or a wear-resistant layer 4 lying at the top.

As can be seen from FIGS. 1 and 3, the base material 3 and the solder 12 are arranged lying on one another, the two parts forming the surface region 1. An interface 7 arranged parallel to the surface 2 is formed between the base material 3 and the solder 12. The solder 12 comprises an alloy 6, in which a plurality of particles of a reactant 5 are embedded. In FIG. 1, the particles are spherical and distributed in the solder 12. In FIG. 3, the particles are cuboidal, are oriented with their longer sides parallel to the interface 7 and are arranged in a plurality of layers, the particles being arranged offset in relation to one another, i.e. staggered.

The wear-resistant layer 4 is formed from the solder 12 by the supply of heat. Owing to the supply of heat, it is possible both for material from the wear-resistant layer 4 to pass into the base material 3 and for material from the base material 3 to pass into the wear-resistant layer 4 through diffusion. As can be seen from FIGS. 2 and 4, a diffusion zone 9 with a bottom end 10 and a top end 11 has formed after heat has been supplied between the base material 3 and the wear-resistant layer 4, at the expense of both. The ends 10, 11 run parallel to the surface 2. Owing to the supply of heat, the alloy 6 has become liquid and the reactant 5 has partially dissolved in the alloy 6. The dissolved reactant 5 has undergone a chemical reaction with the alloy 6, forming a hard material 8.

As can be seen from FIG. 2, the spherical particles have become smaller compared to FIG. 1 after heat has been supplied. However, the particles can also stay the same size. Spherical, overlapping zones made up of the hard material 8 have formed around the reactant 5. The edges of the zones run parallel to the surfaces of the associated particles. As can be seen from FIG. 4, the cuboidal particles have become smaller compared to FIG. 3 after heat has been supplied, and have adopted an ellipsoidal shape, the long axis being arranged parallel to the surface 2 and the short axis being arranged perpendicular thereto. The particles can also retain their shape, however. Ellipsoidal, overlapping zones made up of the hard material 8 have formed around the particles. The edges of the zones run parallel to the surfaces of the particles. As can be seen from FIGS. 2 and 4, the zones made up of the hard material 8 extend both in the wear-resistant layer 4 and in the diffusion zone 9.

Although the invention has been explained and described in more detail by the preferred exemplary embodiment, the invention is not limited by the disclosed examples, and other variations can be derived therefrom by a person skilled in the art without departing from the scope of protection of the invention.

The invention claimed is:

1. A method for applying a wear-resistant layer having a titanium-comprising base material to a turbomachine component, comprising:
    mixing a solder which comprises a titanium-comprising alloy and particles that are distributed in the alloy and comprise a reactant;
    applying the solder to predetermined points of the turbomachine component;
    introducing a quantity of heat into the solder and into the turbomachine component, such that the alloy becomes liquid and the reactant changes through diffusion processes with the solder and undergoes a chemical reaction with the alloy, forming a hard material;

cooling the solder, such that the alloy becomes solid, wherein the reactant is a carbon-containing compound, and wherein the base material comprises a titanium alloy.

2. The method as claimed in claim 1, wherein the reactant is a nonmetal, a semi-metal and/or a ceramic.

3. The method as claimed in claim 1, wherein the solder is produced in such a manner that it is a mat, a paste, a sintered material or a strip.

4. The method as claimed in claim 1, wherein the particles are platelet, cuboidal, or spherical.

5. The method as claimed in claim 4, wherein the platelet or coboidal particles are arranged in substantially plane-parallel layers.

6. The method as claimed in claim 1, wherein the composition of the alloy is selected in such a manner that the melting temperature of the alloy is lower than the beta transus temperature of the base material.

7. The method as claimed in claim 1, wherein the alloy is a brazing solder.

8. The method as claimed in claim 1, wherein the quantity of heat and the time of introduction thereof are determined in such a manner that the temperatures of the solder and of the turbomachine component are lower than the beta transus temperature of the base material.

9. The method as claimed in claim 1, wherein the quantity of heat and the time of introduction thereof are determined in such a manner that the reactant is converted in the chemical reaction.

10. The method as claimed in claim 1, wherein the quantity of heat and the time of introduction thereof are determined in such a manner that the reactant partially passes through diffusion into the base material, where it undergoes a chemical reaction with the base material, forming the hard material.

11. A turbomachine component having a wear-resistant layer, wherein the wear-resistant layer is produced as claimed in claim 1.

12. The method of claim 1, wherein the reactant comprises graphite, and the hard material formed is titanium carbide.

13. The method of claim 1, wherein the base material comprises TiAl6V4.

14. The method of claim 3, wherein the solder is produced in such a manner that it is an adhesive strip.

15. The method of claim 7, wherein the brazing solder has a melting temperature of between 750° C. and 950° C.

16. A method for applying a wear-resistant layer having a titanium-comprising base material to a turbomachine component, comprising:

mixing a solder which comprises a titanium-comprising alloy and particles that are distributed in the alloy and comprise a reactant;

applying the solder to predetermined points of the turbomachine component;

introducing a quantity of heat into the solder and into the turbomachine component, such that the alloy becomes liquid and the reactant changes through diffusion processes with the solder and undergoes a chemical reaction with the alloy, forming a hard material;

cooling the solder, such that the alloy becomes solid, wherein the reactant is a carbon-containing compound, and wherein the base material comprises pure titanium or pure titanium with additives.

17. The method of claim 16, wherein the base material comprises carbon as an additive.

* * * * *